United States Patent [19]
Bronowski et al.

[11] Patent Number: 4,708,590
[45] Date of Patent: Nov. 24, 1987

[54] COVER FOR TURBINES AND PUMPS

[75] Inventors: Helmut Bronowski; Christian Dahlke, both of Heidenheim, Fed. Rep. of Germany

[73] Assignee: J.M. Voith GmbH, Fed. Rep. of Germany

[21] Appl. No.: 820,691

[22] Filed: Jan. 16, 1986

[30] Foreign Application Priority Data

Jan. 22, 1985 [DE] Fed. Rep. of Germany ....... 3501883

[51] Int. Cl.$^4$ ............................................. F01D 25/28
[52] U.S. Cl. ............................... 415/219 C; 415/204; 415/500
[58] Field of Search ........... 415/219 C, 219 R, 219 A, 415/219 B, 500, 204, 205, 164, 163

[56] References Cited

U.S. PATENT DOCUMENTS

| | | | |
|---|---|---|---|
| 1,792 | 10/1864 | Leffel | 415/164 |
| 3,169 | 10/1868 | Leffel | 415/164 |
| 1,951,199 | 3/1934 | Moody | 415/164 |
| 1,987,082 | 1/1935 | Sharp | 415/164 |
| 2,687,280 | 8/1954 | Sharp | 415/164 |
| 2,736,530 | 2/1956 | Koepke | 415/219 R |
| 3,186,685 | 6/1965 | Chatfield et al. | 415/205 |
| 3,276,742 | 10/1966 | Yokoi | 415/170 R |
| 3,360,237 | 12/1967 | Surber et al. | 415/219 C |

FOREIGN PATENT DOCUMENTS 1063061 4/1954 France ................. 415/157
57-2473(A) 1/1982 Japan .

Primary Examiner—Robert E. Garrett
Assistant Examiner—John T. Kwon
Attorney, Agent, or Firm—Ostrolenk, Faber, Gerb & Soffen

[57] ABSTRACT

A cover for turbines or pumps, which is substantially less expensive than a cover having a cast construction. The cover is made of welded metal plates in a shape which generally corresponds to that of Kaplan type turbines, pumps or the like, and includes a number of thick walled rings and shells having a conical shape or envelope.

14 Claims, 4 Drawing Figures

Fig. 3
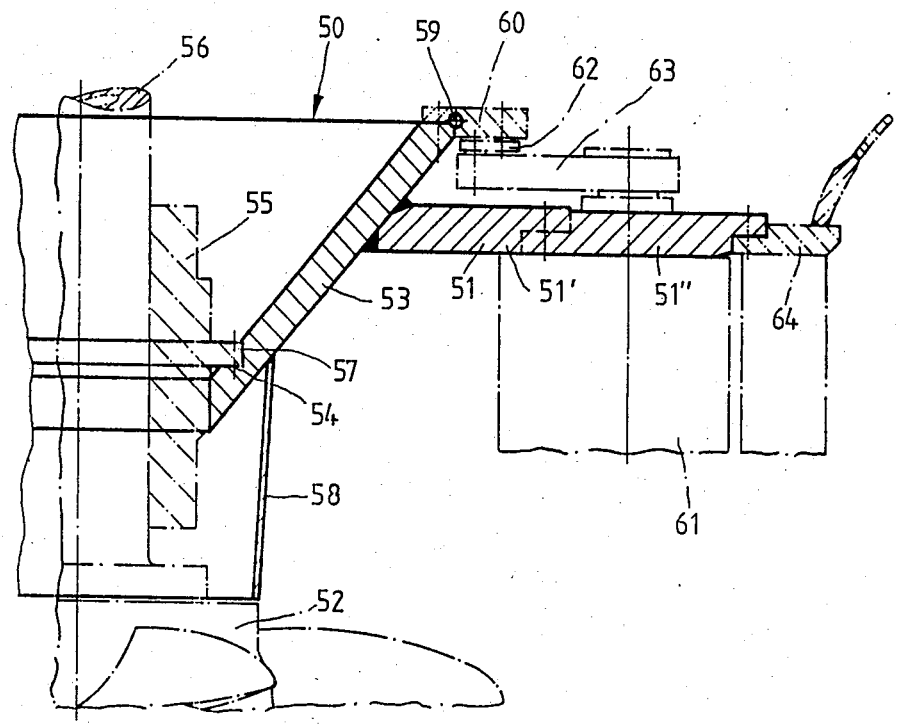
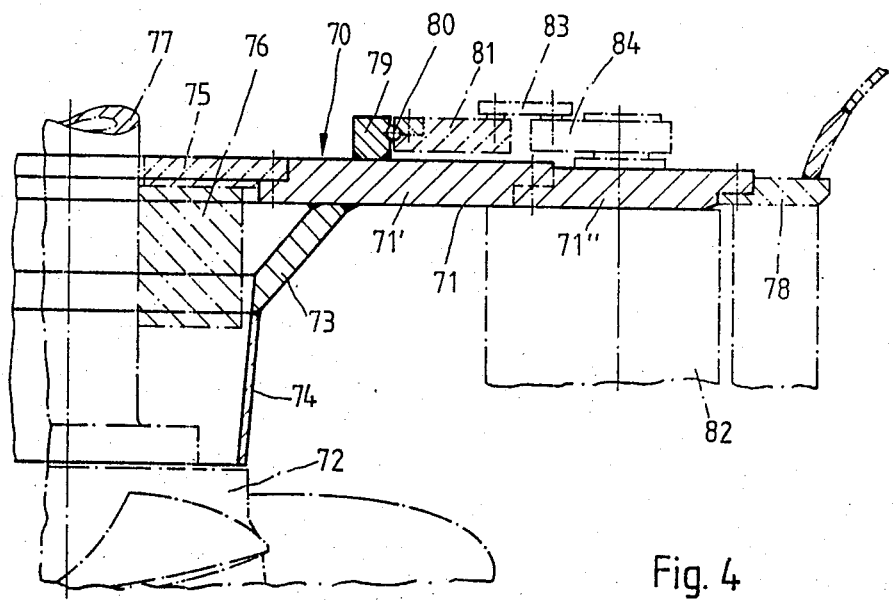
Fig. 4

1

COVER FOR TURBINES AND PUMPS

BACKGROUND OF THE INVENTION

The present invention relates, in general, to covers formed of welded metal plates for propeller or Kaplan type turbines or other similarly shaped pumps of the type shown in U.S. Pat. No. 1,779,191.

Generally, certain components for pumps and water turbines have been of cast construction. However, casting is a time consuming and expensive process. A number of schemes have attempted to overcome the problems inherent with casting, such as that shown in Federal Republic of Germany Patent No. 876 230, which utilizes a cover comprised of framework construction, having numerous cavities and a plurality of shells having the shape of conical envelopes with rings connecting them to each other in conjunction with filler plates. However, this still requires considerable expense for the machining of the connecting rings as well as extensive welding.

Another attempt to overcome this problem may be found in Japanese Patent Publication No. 57-2473 (A), which consists of numerous individual parts which are combined to form a framework construction which is generally hollow in cross section. However, this cover arrangement can only be manufactured through the use of substantial labor which is again expensive.

SUMMARY OF THE INVENTION

It is an object of the invention to produce a device which may be less expensively made, such as by welding instead of casting.

It is another object of the present invention to reduce the number of individual parts of the machine cover without reducing its inherent stability and strength. Also, it is an object of the present invention to produce shells which are of simple shape and are produced by bending while requiring only a slight amount of machining and which may thereafter be preferably connected together by weld seams.

It is still a further object of the present invention to produce a shell wherein the welds may be performed by a machine such as a robot, or the like.

It is another object of the invention to produce a cover for turbines or pumps or the like, comprising a rotatable shaft, a plurality of axially spaced apart rings and a plurality of shells, each of which is disposed between two adjacent rings, the shells being fastened on the rings by welding and/or bolts and the like.

The invention concerns a cover for a propeller, turbine, pump or the like, wherein that propeller, turbine, pump or the like comprises an outer cover or housing in which is disposed a rotatable shaft with a rotatable runner in the form of a propeller, for example, on the shaft. The shaft is supported by two bearings, a thrust bearing at one end for the axial thrust applied to the shaft and a radial bearing disposed closer to the runner. The cover of concern to the invention extends transversely of the housing and of the shaft and annularly surrounds the shaft. The bearings are supported to the cover.

The cover is itself comprised of a number of flat rings. In the first embodiment, it is comprised of three flat rings which are axially spaced apart along the shaft. The ring in the middle is of greater diameter than the two outer rings. A respective conically shaped shell extends from each outer ring to the middle ring. The shells are attached to the middle ring at welds and the attachment is such that a plane or axis through the profile of the walls of each of the conical shells would intersect inside the profile of the wall of the middle ring. Each of the outer rings supports one of the two bearings for the shaft.

One or more rigidifying ribs may be provided at spaced locations around the cover and extending between the middle ring and one of the other rings. In addition, if the ring is comprised of a number of circular segment parts, ribs serving as flanges may be disposed on the circumferential ends of the sections and two adjacent flanges at the ends of two adjacent sections may be bolted together to form the entire cover.

There are a plurality of guide vanes in the outer covering of the housing for passage of fluid therethrough. A servomotor connected with the guide vanes adjusts their orientation. The servomotor is supported on one of the rings. There may be guide rollers on the ribs and a control ring for the servomotor supported on those guide rollers.

In an alternate embodiment, one shell, rather than two, is provided and fewer rings would therefore be provided. There is only one transverse ring in that embodiment. The shell, which is conically shaped, extends down from the ring toward the runner. A separate second shell is attached to the first mentioned shell and the second shell is also conically tapered. In one version of this embodiment, the first of the shells intersects the flat transverse ring toward the middle of the shell. In another embodiment, the first shell is attached to the flat ring at the end of the shell. The first shell has an angle of inclination that is sharper, at least approximately 45° to the axis of the runner, whereas the second shell has a lesser angle of inclination to the shaft.

In all of the embodiments, the shells are attached to the rings and/or to each other through welds.

DESCRIPTION OF THE FIGURES

Reference may be now had to the accompanying drawings in which:

FIG. 3 shows a second embodiment of a cover comprised essentially of three parts in a view similar to that of FIG. 2; and FIG. 4 shows a third embodiment of a cover which is shaped similar to that in FIG. 3 and again in a view corresponding to that of FIG. 2.

DESCRIPTION OF THE PREFERRED EMBODIMENT

Figure 1:
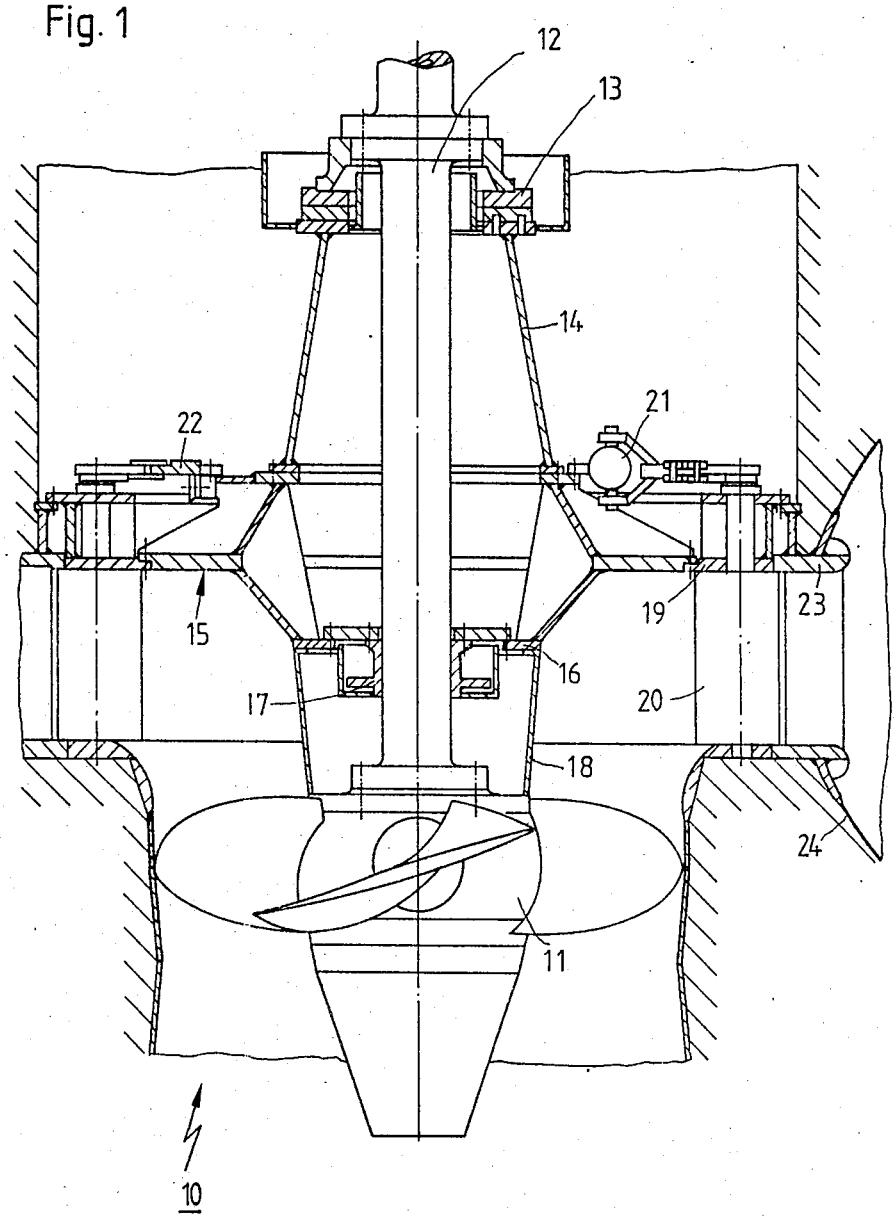
FIG. 1 is a longitudinal section through a Kaplan type turbine having a cover comprised essentially of three flat rings with conical shaped shells inserted between them.

Referring to FIG. 1, there is shown a Kaplan type turbine in a partial cross sectional view. A turbine 10 has a runner 11 (such as a propeller) with a vertically arranged shaft 12 which is supported via thrust bearing 13 on a generally frustoconically shaped bearing support 14. The bearing support 14 is seated on turbine cover 15. A radial bearing 17 is disposed on the shaft 12 with the bearing being held by support disk 16. A water flow shield 18 extends towards runner 11 from the cover 15.

The cover 15 rests at its edge on an outer cover 19 which forms an annular frame. Within the outer cover 19 there are supported adjustable guide vanes 20. Servomotors/21 which are fastened on the cover 15 are used to adjust control rings 22 and guide vanes 20. The outer cover 19 is fastened on a support vane ring 23 of spiral case 24. Fluid would generally flow in from each side, thereby passing by the vanes and essentially turn 90° towards the runner 11.

Figure 2:
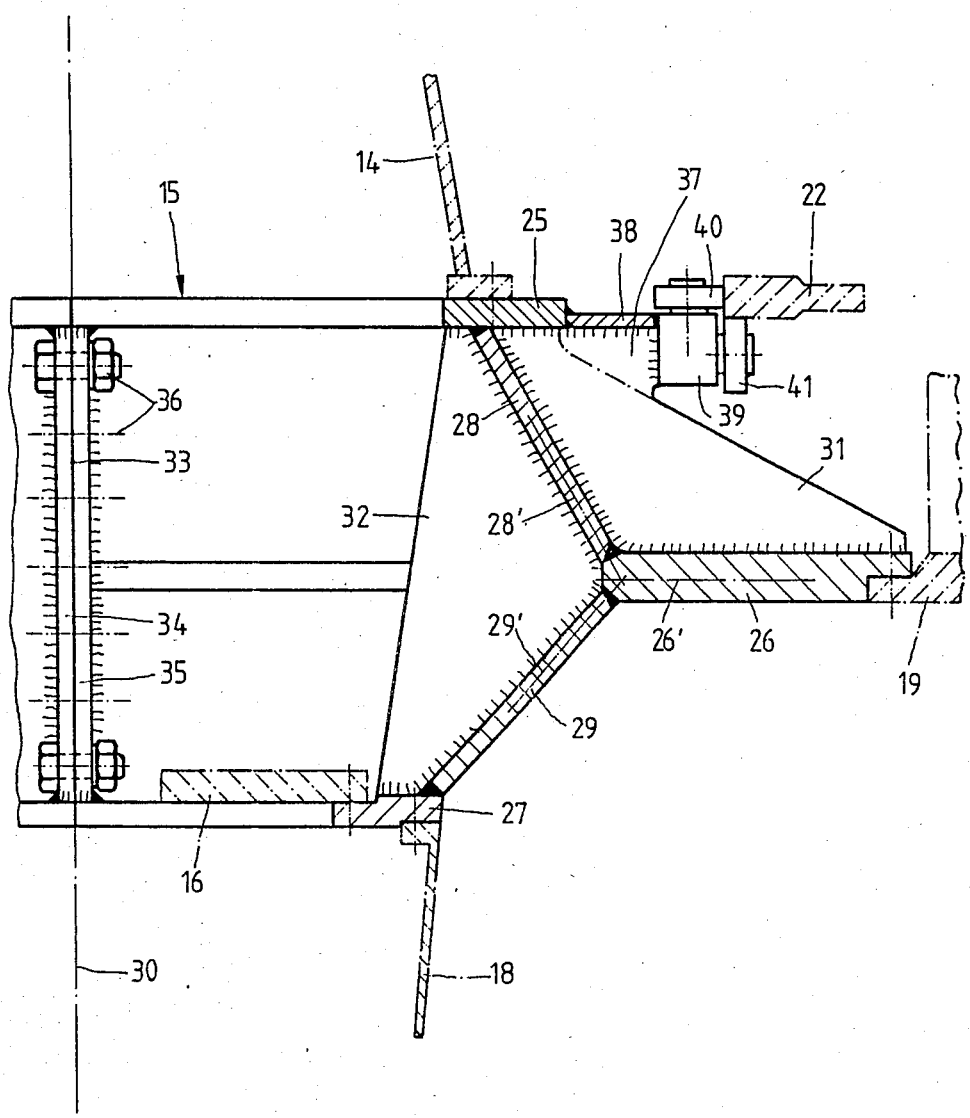
FIG. 2 shows a portion of the cover of FIG. 1 on a somewhat larger scale.

Referring now to FIG. 2, an enlarged portion of the turbine cover 15 as shown in FIG. 1, may be seen. The turbine cover 15 is generally comprised of metal plates. The cover 15 includes three flat circular rings 25, 26 and 27 as well as two conically shaped or inclined shells 28, 29. These parts 25-29 are arranged for rotational symmetry with respect to the axis 30 and are connected together by welding. The rings 25, 26 and 27 are arranged so as to be axially spaced from each other. The largest diameter middle ring 26 rests on the frame or outer cover 19 and is approximately axially centrally disposed between the other rings, namely the second ring and first ring 25, 27 of the cover 15. Shells 28, 29 are attached around the inner edge of the center ring 26, with the shell 28 tapering toward the second ring 25 and the other shell 29 tapering toward the first ring 27. Shells 28 and 29 are welded to the opposite sides of the radially inner edge of the central ring 26. They are also tapered and the welds are located such that their centroidal axes 26', 28' and 29' intersect at a point inside the central ring 26, which produces a low stressing flexure moment about the middle ring 26.

The smallest diameter ring 27 closes the shell 29 off on one end. The ring 27 is contoured so as to receive the bearing support disk 16 which is used for the radial bearing 17, with the ring 27 also being used for attachment of the water flow shield 18. Ring 25 closes the other shell 28 off at the other end and is contoured so as to have the thrust bearing support 14 mounted thereon. It is to be understood that components 25-29 of the cover 15 are machined only at the contact surfaces on which other parts act and for preparation of weld seams. Therefore, the remaining surfaces may be left unmachined after they have been cut out from a larger plate or as stock from a rolling mill.

Cover 15 is provided with approximately triangular ribs 31, 32 which provide stiffening strength to the structure. After machining and welding of the seams between rings 25, 26 and 27 and the shells 28, 29, the ribs 31 and 32, which are preferably cut out from plates, are inserted so as to extend radially into cover 15 and are thereafter welded to the adjoining parts. Rib 31 extends along the shell 28 and connects the central ring 26 with ring 25. Rib 32 is arranged in the same plane as rib 31 and extends along shell 28 and 29, connecting together all three rings 25, 26 and 27 of turbine cover 15. Additionally, ribs 31 and 32 are uniformly arranged or distributed around the circumference of the cover 15. When a cover is comprised of several sections less than a complete circle, ribs, like 32, serve as partial flanges 34, 35 and are provided on both sides of the joint 33 between cover parts. Bolts 36 pass through partial or joint flanges 34, 35.

A control ring 22 is mounted adjacent ribs/31 which is provided close to the ring 25. The ribs/31 have an extension 37 whereby additional mounting strength is provided to control ring 22 by stiffening rib 38 which is transverse the machine axis 30. This stiffening rib 38 is welded at the various contact points of the extensions 37. A bearing pedestal 39 is attached at the front of extension 37. The pedestal 39 has a roller 40 for the radial guidance of control ring 22 while a roller 41 is provided for axial guidance of the ring 22.

Referring now to FIG. 3, an alternate embodiment of the present invention in a view corresponding to that of FIG. 2 may be seen. Here, the turbine cover 50 has a thick walled flat ring 51 which is arranged in a radially extending plane. A conically shaped shell 53 is welded, partially along its axial length, to the inner edge of the ring 51. The shell 53 tapers down toward the runner 52 at an angle of approximately 45° with respect to the axis of the runner 52. A resting surface 54 is provided on the shell 53. This allows a disk 57 to be placed thereon. The disk 57 bears the radial bearing 55 of the turbine shaft 56.

A second conically shaped envelope 58, conically shaped a lesser angle than shell 53, is welded to the shell 53. Since the shell 58 serves merely as a water flow shield, it has a relatively thin wall. An anti-friction bearing 59 is disposed on that end of the shell 53 which is opposite the resting surface 54. It is used for the mounting of a control ring 60 for the displacement of guide vane 61 mounted in the ring 51. The control ring 60 is connected via a link 62 to an adjustment lever 63 for a corresponding vane 61. Disposed adjacent the outer edge of the ring 51 is support vane ring 64.

As in the embodiment of FIG. 1, machining of individual parts 51, 53 and 58 which are made of metal plates, need only be done at those places where weld seams and resting surfaces for adjoining parts are indicated.

Additionally, ring 51 may be divided into a number of parts such as an inner ring 51' and an outer ring 51" (as indicated by the dashed line) which would greatly simplify removal of the runner 52, since the outer ring 51" together with the guide vane 61 mounted thereon may remain fastened to the support vane ring 64 and therefore only the turbine cover 50 with inner ring 51' needs to be removed or handled.

Referring now to FIG. 4, an additional alternate embodiment in a view similar to that of FIGS. 2 and 3 is shown. Here, it can be seen that the turbine cover 70 has a reduced axial length as compared with that of FIG. 3. The cover 70 again is comprised of plate parts which are welded to each other. These plate parts include a radially extending flat ring 71 having welded to the side thereof toward the runner 72 a conically shaped shell 73. This shell 73 performs the function of increasing the rigidity of cover 70. At the end of shell 73 there is welded a shell 74 having the shape of a conical envelope, and which tapers towards runner 72. This shell 74 serves as a water flow shield. The ring 71 of the turbine cover 70 is contoured to receive a support disk 75 used for a radial bearing 76 for the turbine shaft 77. The outer edge of the ring 71 rests against a support ring 78. Welded to flat ring 71 is a ring 79 which is coaxial to the axis of the machine and receives an anti-friction bearing 80 which is used for control ring 81 and which is in turn used for adjusting guide vanes 82 mounted in the cover ring 71. The control ring 81 is connected in a fashion similar to that of FIG. 3, via a link 83 to a guide vane lever 84 of a corresponding guide vane 82. Further, in a manner similar to that of FIG. 3 the ring 71 may be divided up into an inner ring 71' and an outer ring 71", thereby aiding in disassembly.

Although the present invention has been described in connection with a plurality of preferred embodiments thereof, many other variations and modifications will now become apparent to those skilled in the art such as, for example, the use of fasteners such as rivets or bolts in place of some or all welds. It is preferred, therefore, that the present invention be limited not by the specific disclosure herein, but only by the appended claims.

What is claimed is:

1. In a hydraulic machine of the type of a tubular (Kaplan) or propeller turbine or similarly shaped pump, the improvement comprising a cover for a fluid impeller therein, said hydraulic machine comprising a rotatable shaft; a rotatable runner on the shaft which applies an axial force on the shaft in response to rotation of said runner; bearings on the shaft for supporting the shaft for rotation about an axis; and an outer covering around the shaft and the runner;

the cover being radially spaced from said shaft and annularly surrounding the shaft; and the bearings supporting the shaft being attached to the cover, whereby the cover supports the shaft;

the outer covering being disposed radially outwardly of the cover, the cover resting on the outer covering and being supported thereupon;

the cover comprising three flat rings which extend transversely of the shaft and are axially spaced apart, with a centeral most middle ring being the ring of largest diameter and extending to and resting on the outer covering; each of the outer rings being connected to a respective one of the supporting bearings for the shaft; the first outer ring being closer to the runner than the second outer ring;

a first conical shell conically extending from a relatively smaller radius location on the first outer ring to the middle ring and presenting a surface which faces downwardly toward said runner and outwardly away from said shaft; a second conical shell extending from the second outer ring and flaring conically wider to the middle ring.

2. The cover of claim 1, wherein the middle ring is of an internal diameter selected such that each of the shells extends approximately to the internal diameter region of the middle ring.

3. The cover of claim 2, wherein the first and second shells are respectively welded to the first and second axial sides of the middle ring; the locations of the welds attachments and the orientations of the first and second shells are such that the centroidal axes through the profile of the walls of the first and second shells intersect at a point located inside the profile of the wall of the middle ring.

4. The cover of claim 2, further comprising a generally triangularly shaped rigidifying rib extending along an outer surface of the second conical shell from the second ring toward the middle ring and extending radially outwardly from the middle ring.

5. The cover of claim 4, wherein there are a plurality of the rigidifying ribs.

6. The cover of claim 5, wherein at least some of the ribs have radial and axial guide rollers; a control ring is connectable with a servomotor for operating the servomotor, the control ring riding on the guide rollers.

7. The cover of claim 1, wherein the bearings comprise, adjacent the shaft, at the side thereof toward the first ring, substantially in the plane of the first ring, a radial bearing by which the shaft is supported; and adjacent the shaft, at the side thereof toward the second outer ring, a thrust bearing by which the shaft is supported; means connecting the radial bearing with the first ring; means connecting the thrust bearing with the second outer ring.

8. The cover of claim 4, wherein the cover is comprised of a plurality of sections which together annularly surround the shaft; and said ribs are provided at the edges of the cover sections for serving as joint flanges; adjacent cover sections are fastened together by fastening together of the respective joint flanges at adjacent ends of the cover sections.

9. The cover of claim 1, wherein the cover is comprised of a plurality of sections which together annularly surround the shaft; and ribs generally parallel to the shaft at the edges of the cover sections for serving as joint flanges; adjacent cover sections are fastened together by fastening together of the respective joint flanges at adjacent ends of the cover sections.

10. The cover of claim 1, further comprising a plurality of guide vanes in the outer covering for passage of fluid past the guide vanes; a servomotor connected with the guide vanes for adjusting the orientations thereof.

11. The cover of claim 10, wherein the servomotor is supported on the second ring.

12. The cover of claim 1, wherein the first ring includes a water flow shield which extends from the first ring and toward the runner.

13. The cover of claim 4, further comprising at least one generally triangularly shaped inner rigidfying rib extending along inner surfaces of the first and second conical shells from the second ring to the middle ring and thence to the first ring, said inner rib extending radially inwardly from the first and second shells and from the middle ring.

14. The cover of claim 13, wherein a plurality of such inner rigidifying ribs are provided.

* * * * *